United States Patent
Watanabe et al.

(10) Patent No.: US 11,934,708 B2
(45) Date of Patent: Mar. 19, 2024

(54) IMAGE FORMING DEVICE AND CONTROL METHOD OF IMAGE FORMING DEVICE THAT IMPLEMENT AN ADJUSTMENT PATTERN GROUP FOR LIQUID ADJUSTMENT

(71) Applicant: SEIKO EPSON CORPORATION, Tokyo (JP)

(72) Inventors: Ikumi Watanabe, Shiojiri (JP); Masahiro Someno, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/181,278

(22) Filed: Mar. 9, 2023

(65) Prior Publication Data

US 2023/0289107 A1 Sep. 14, 2023

(30) Foreign Application Priority Data

Mar. 11, 2022 (JP) .................. 2022-038061

(51) Int. Cl.
G06F 3/12 (2006.01)

(52) U.S. Cl.
CPC .......... G06F 3/1204 (2013.01); G06F 3/1254 (2013.01)

(58) Field of Classification Search
None
See application file for complete search history.

(56) References Cited

U.S. PATENT DOCUMENTS

| | | | | |
|---|---|---|---|---|
| 2007/0040884 A1* | 2/2007 | Shoki | ................... | B41J 2/04573 347/101 |
| 2007/0146779 A1* | 6/2007 | Yamada | ............... | H04N 1/2307 358/448 |
| 2008/0218778 A1* | 9/2008 | Kusunoki | .......... | G03G 15/0194 358/1.9 |
| 2015/0370206 A1* | 12/2015 | Hitosugi | ............ | G03G 15/0121 399/53 |
| 2016/0223930 A1* | 8/2016 | Harada | ................ | G03G 15/556 |
| 2023/0291843 A1* | 9/2023 | Watanabe | ................ | H04N 1/00 358/1.9 |

FOREIGN PATENT DOCUMENTS

| | | | | |
|---|---|---|---|---|
| JP | 2017001321 A | * | 1/2017 | |
| JP | 2019-090874 A | | 6/2019 | |
| JP | 2019090874 A | * | 6/2019 | |
| JP | 2019-171667 A | | 10/2019 | |

* cited by examiner

Primary Examiner — Henok Shiferaw
(74) Attorney, Agent, or Firm — WORKMAN NYDEGGER

(57) ABSTRACT

An image forming device includes: a scanner mechanism; an inkjet-type print mechanism; a display mechanism; and a control unit configured to control the scanner mechanism, the print mechanism, and the display mechanism. The control unit includes a pattern storage unit configured to store a temperature, a humidity, and an adjustment pattern group including a plurality of adjustment patterns, in association with each other, a first acquisition unit configured to acquire a first measured temperature and a first measured humidity from a temperature and humidity sensor, and a data generation unit configured to read an adjustment pattern group corresponding to the first measured temperature and the first measured humidity acquired by the first acquisition unit from the pattern storage unit, and generate print data including the read adjustment pattern group.

5 Claims, 11 Drawing Sheets

FIG. 4

| GROUP IDENTIFICATION INFORMATION | FIRST PATTERN NUMBER | SECOND PATTERN NUMBER | THIRD PATTERN NUMBER | FOURTH PATTERN NUMBER |
|---|---|---|---|---|
| A | 1 | 3 | 4 | 5 |
| B | 1 | 3 | 5 | 6 |
| C | 1 | 6 | 7 | 8 |
| D | 2 | 4 | 5 | 6 |
| E | 2 | 4 | 5 | 7 |
| ... | ... | ... | ... | ... |

IMAGE FORMING DEVICE AND CONTROL METHOD OF IMAGE FORMING DEVICE THAT IMPLEMENT AN ADJUSTMENT PATTERN GROUP FOR LIQUID ADJUSTMENT

The present application is based on, and claims priority from JP Application Serial Number 2022-038061, filed Mar. 11, 2022, the disclosure of which is hereby incorporated by reference herein in its entirety.

BACKGROUND

1. Technical Field

The present disclosure relates to an image forming device and a control method of an image forming device.

2. Related Art

JP-A-2019-171667 discloses a printing device that scans an inspection pattern, which is divided into two and printed, with a scanner and performs a correction processing of a printing condition.

In the printing device disclosed in JP-A-2019-171667, when a user adjusts parameters such as a color tone of printing of the printing device using an adjustment pattern, it is necessary to print the adjustment pattern in accordance with a use environment (temperature and humidity) at that time.

However, the number of adjustment patterns that can be printed on one sheet is limited. It is difficult for the user to visually determine which adjustment pattern is suitable for the use environment among the printed adjustment patterns. As a result, it may be difficult to appropriately adjust a print mechanism in accordance with the use environment.

SUMMARY

According to an aspect of the present disclosure, an image forming device includes: a scanner mechanism; an inkjet-type print mechanism; a display mechanism; and a control unit configured to control the scanner mechanism, the print mechanism, and the display mechanism. The control unit includes a pattern storage unit configured to store a temperature, a humidity, and an adjustment pattern group including a plurality of adjustment patterns, in association with each other, a first acquisition unit configured to acquire a measured temperature and a measured humidity from a temperature and humidity sensor, and a data generation unit configured to read an adjustment pattern group corresponding to the measured temperature and the measured humidity acquired by the first acquisition unit from the pattern storage unit, and generate print data including the read adjustment pattern group.

According to another aspect of the present disclosure, a control method of an image forming device is provided. The image forming device includes a scanner mechanism, an inkjet-type print mechanism, a display mechanism, and a control unit configured to control the scanner mechanism, the print mechanism, and the display mechanism. The control unit includes a pattern storage unit configured to store a temperature, a humidity, and an adjustment pattern group including a plurality of adjustment patterns, in association with each other. The control unit executes an acquisition step of acquiring a measured temperature and a measured humidity from a temperature and humidity sensor, and a data generation step of reading an adjustment pattern group corresponding to the measured temperature and the measured humidity acquired in the acquisition step from the pattern storage unit and generating print data including the read adjustment pattern group.

BRIEF DESCRIPTION OF THE DRAWINGS

FIG. 4 is a table showing an example of a second table.

DESCRIPTION OF EXEMPLARY EMBODIMENTS

Hereinafter, an embodiment will be described with reference to the drawings.

Figure 1:
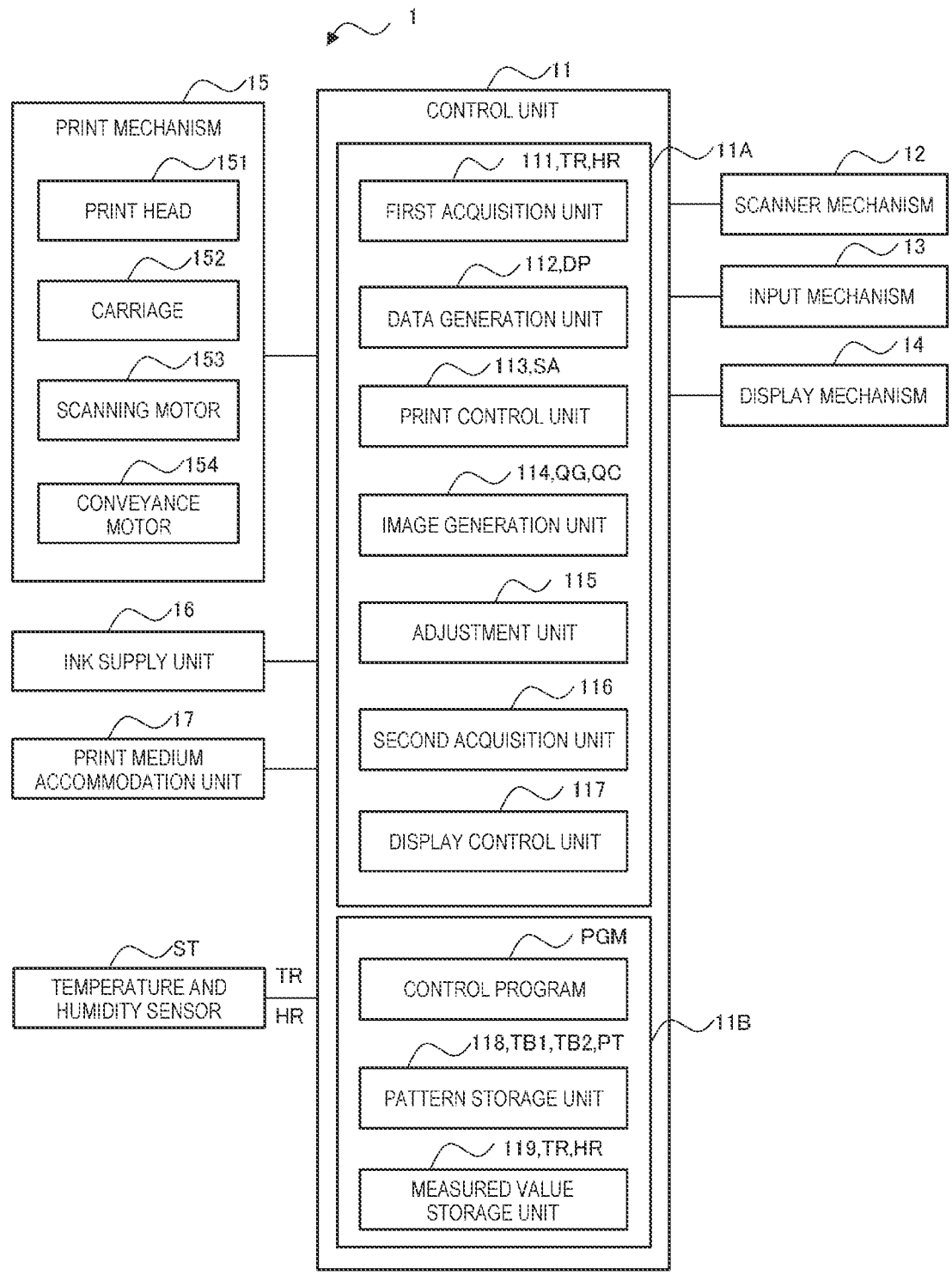
FIG. 1 is a diagram showing an example of a configuration of a multifunction peripheral according to an embodiment.

A multifunction peripheral 1 according to the embodiment will be described. FIG. 1 is a diagram showing an example of a configuration of the multifunction peripheral 1 according to the embodiment.

The multifunction peripheral 1 corresponds to an example of an "image forming device". The multifunction peripheral 1 is a device that prints images such as characters and figures on a print medium M such as a print sheet.

As shown in FIG. 1, the multifunction peripheral 1 includes a control unit 11, a scanner mechanism 12, an input mechanism 13, a display mechanism 14, a print mechanism 15, an ink supply unit 16, a print medium accommodation unit 17, and a temperature and humidity sensor ST.

The control unit 11 includes a processor 11A such as a central processing unit (CPU) and a memory 11B such as a read only memory (ROM) and a random access memory (RAM), and controls each unit of the multifunction peripheral 1. The memory 11B stores a control program PGM. The memory 11B may include a magnetic storage device such as a hard disk drive (HDD) or a semiconductor storage device such as a solid state drive (SSD).

In the control unit 11, the processor 11A reads the control program PGM stored in the memory 11B and executes processing. In other words, the control unit 11 executes the processing by cooperation of hardware and software.

The processor 11A may be a single processor, or a plurality of processors may function as the processor 11A.

In the embodiment, the processor 11A executes the control program PGM to control each unit of the multifunction peripheral 1, whereas the present disclosure is not limited thereto. The control unit 11 may be, for example, an application specific integrated circuit (ASIC). The ASIC may execute processing by an implemented function. The control unit 11 may be, for example, a signal processing circuit. The signal processing circuit may perform a signal processing and execute the processing.

The scanner mechanism 12 includes an image sensor such as a charge coupled device (CCD), a complementary metal oxide semiconductor (CMOS), or a contact image sensor (CIS), reads the image printed on the print medium M such as the print sheet, and generates image data. In the embodiment, the scanner mechanism 12 reads an adjustment pattern group PG shown in FIGS. 5 and 6, and generates an adjustment image group QG. The scanner mechanism 12 reads a code CD shown in FIGS. 5 and 6, and generates a code image QC.

The input mechanism 13 includes an input unit such as an operation switch or a touch panel provided in the multifunction peripheral 1, detects an operation performed on the input unit by a user, and outputs a detection signal corresponding to the operation to the control unit 11. The control unit 11 executes processing corresponding to an operation of the user based on an input signal from the input mechanism 13.

The display mechanism 14 includes a plurality of light emitting diodes (LEDs), a display panel, and the like, and executes turning on, turning off, and blinking of the LEDs in a predetermined mode, display of information on the display panel, and the like under the control of the control unit 11.

The print mechanism 15 prints images such as characters and figures on the print medium M such as the print sheet with an ink under the control of the control unit 11. The print mechanism 15 includes a print head 151, a carriage 152, a scanning motor 153, and a conveyance motor 154 as components related to printing.

The print head 151 is of an inkjet type, and dispenses an ink supplied from the ink supply unit 16 toward the print medium M. The carriage 152 has the print head 151 mounted thereon, and performs scanning in a main scanning direction X intersecting with a sub-scanning direction Y. The sub-scanning direction Y indicates a conveyance direction of the print medium M. The scanning motor 153 performs scanning by the carriage 152 in the main scanning direction X. The conveyance motor 154 conveys the print medium M in the conveyance direction, that is, the sub-scanning direction Y.

The print mechanism 15 will be further described with reference to FIG. 2.

The ink supply unit 16 accommodates an ink tank that stores the ink, and supplies the ink from the ink tank to the print head 151 of the print mechanism 15. The ink supplied to the print head 151 by the ink supply unit 16 is, for example, an ink of each color of cyan (C), magenta (M), yellow (Y), and black (K).

The print medium accommodation unit 17 accommodates the print medium M. When the print medium M is a cut sheet, the print medium accommodation unit 17 feeds the stored cut sheet to a conveyance path (not shown) by conveyance of the conveyance motor 154. The print medium accommodation unit 17 may collect a printed object which is the print medium M after printing. The configuration for collecting the printed object may be a configuration in which cut sheets are stacked and placed.

The temperature and humidity sensor ST detects, for example, a temperature T and a humidity H around the print mechanism 15. The temperature and humidity sensor ST includes a temperature sensor and a humidity sensor. The temperature sensor includes a resistance temperature detector, a linear resistor, a thermistor, or the like. The humidity sensor includes a resistance change type humidity sensor, a capacitance change type humidity sensor, or the like.

The temperature and humidity sensor ST is disposed, for example, inside a housing in which the print mechanism 15 is accommodated. The temperature and humidity sensor ST outputs, to the control unit, a signal indicating a measured temperature TR measured by the temperature sensor and a signal indicating a measured humidity HR measured by the humidity sensor.

Next, functional blocks included in the control unit 11 of the multifunction peripheral 1 will be described.

The control unit 11 includes, as the functional blocks, a first acquisition unit 111, a data generation unit 112, a print control unit 113, an image generation unit 114, an adjustment unit 115, a second acquisition unit 116, a display control unit 117, a pattern storage unit 118, and a measured value storage unit 119.

When the processor 11A executes the control program PGM, the control unit 11 functions as the first acquisition unit 111, the data generation unit 112, the print control unit 113, the image generation unit 114, the adjustment unit 115, the second acquisition unit 116, and the display control unit 117. When the processor 11A executes the control program PGM, the control unit 11 controls the memory 11B to function as the pattern storage unit 118 and the measured value storage unit 119.

The control unit 11 detects a dispensing failure of a nozzle 39 disposed in the print head 151 of the print mechanism 15. For example, the print head 151 includes a residual vibration detection circuit (not shown). The control unit 11 detects the dispensing failure of each nozzle 39 by detecting a residual vibration waveform generated in a drive signal path, when each nozzle 39 is driven to dispense ink, via the residual vibration detection circuit.

A method of detecting the dispensing failure of the nozzle 39 by the control unit 11 will be further described with reference to FIG. 2.

The pattern storage unit 118 stores the temperature T, the humidity H, and the adjustment pattern group PG in association with each other. Each of the adjustment pattern groups PG includes a plurality of adjustment patterns PT. For example, each of the adjustment pattern groups PG includes four adjustment patterns PT.

The adjustment pattern PT includes, for example, a first adjustment pattern PT1 to an eighth adjustment pattern PT8.

In the embodiment, the pattern storage unit 118 stores a first table TB1, a second table TB2, and the first adjustment pattern PT1 to eighth adjustment pattern PT8. The first table TB1 associates the temperature T and the humidity H with group identification information DPG. The second table TB2 associates the group identification information DPG with the adjustment pattern PT. The group identification information DPG is information for identifying the adjustment pattern group PG.

The first table TB1 will be further described with reference to FIG. 3.

The second table TB2 will be further described with reference to FIG. 4.

The measured value storage unit 119 stores group identification information DPG1. The group identification information DPG1 is determined by the data generation unit 112 based on the measured temperature TR and the measured humidity HR acquired by the first acquisition unit 111 and the first table TB1.

In the following description, the measured temperature TR acquired by the first acquisition unit 111 may be referred to as a first measured temperature TR1, and the measured humidity HR acquired by the first acquisition unit 111 may be referred to as a first measured humidity HR1.

The measured value storage unit 119 may store the measured temperature TR and the measured humidity HR acquired by the first acquisition unit 111, or may store both the group identification information DPG1 and, the measured temperature TR and the measured humidity HR.

The measured value storage unit 119 stores group identification information DPG2. The group identification information DPG2 is determined by the display control unit 117 based on the measured temperature TR and the measured humidity HR acquired by the second acquisition unit 116 and the first table TB1.

In the following description, the measured temperature TR acquired by the second acquisition unit 116 may be referred to as a second measured temperature TR2, and the measured humidity HR acquired by the second acquisition unit 116 may be referred to as a second measured humidity HR2.

The first acquisition unit 111 acquires the first measured temperature TR1 and the first measured humidity HR1 from the temperature and humidity sensor ST. The first acquisition unit 111 acquires the first measured temperature TR1 and the first measured humidity HR1, for example, when the first acquisition unit 111 receives an instruction to adjust the print mechanism 15 in response to an operation from the user and the control unit 11 determines that there is no nozzle 39 having a dispensing failure.

The data generation unit 112 reads the adjustment pattern group PG corresponding to the first measured temperature TR1 and the first measured humidity HR1 acquired by the first acquisition unit 111 from the pattern storage unit 118, and generates print data DP including the read adjustment pattern group PG.

For example, the data generation unit 112 determines the group identification information DPG of the adjustment pattern group PG corresponding to the first measured temperature TR1 and the first measured humidity HR1 with reference to the first table TB1. Further, the data generation unit 112 reads the adjustment patterns PT included in the adjustment pattern group PG corresponding to the determined group identification information DPG from the pattern storage unit 118 with reference to the second table TB2. In the embodiment, the adjustment patterns PT included in the adjustment pattern group PG are, for example, four adjustment patterns PT. Each of the four adjustment patterns PT is one of the first adjustment pattern PT1 to the eighth adjustment pattern PT8.

The data generation unit 112 generates a code CD indicating the group identification information DPG1. In other words, the data generation unit 112 encodes the group identification information DPG1 and converts the group identification information DPG1 into the code CD. The code CD is included in the print data DP. The code CD is, for example, a two-dimensional code. The code CD is, for example, a QR code (registered trademark).

The data generation unit 112 may generate the code CD indicating the first measured temperature TR1 and the first measured humidity HR1, or may generate the code CD indicating both the group identification information DPG1, and the first measured temperature TR1 and the first measured humidity HR1.

In the embodiment, a case where the code CD is a two-dimensional code will be described, whereas the present disclosure is not limited thereto. The code CD may be, for example, a one-dimensional barcode.

The processing of the data generation unit 112 will be further described with reference to FIGS. 3 and 4.

The print control unit 113 prints the print data DP by the print mechanism 15, and generates an adjustment sheet SA which is the print medium M on which the image corresponding to the print data DP is printed. The print data DP includes four adjustment patterns PT. That is, the adjustment pattern PT is printed on the adjustment sheet SA.

The print control unit 113 may print the adjustment pattern PT and the code CD on the print medium M to generate the adjustment sheet SA on which the adjustment pattern PT and the code CD are printed.

The adjustment sheet SA will be further described with reference to FIGS. 5 and 6.

The image generation unit 114 reads, by the scanner mechanism 12, the adjustment pattern group PG formed on the adjustment sheet SA to generate the adjustment image group QG corresponding to the adjustment pattern group PG. The adjustment image group QG includes adjustment pattern images QT corresponding to the four adjustment patterns PT, respectively. The image generation unit 114 generates, by the scanner mechanism 12, the adjustment image group QG, for example, when the user places the adjustment sheet SA on a document placement surface of the scanner mechanism 12 and performs an operation of executing scanning.

The image generation unit 114 may read, by the scanner mechanism 12, the code CD formed on the adjustment sheet SA to generate the code image QC corresponding to the code CD.

The adjustment image group QG corresponds to an example of an "image group".

The adjustment unit 115 adjusts the print mechanism 15 based on the adjustment image group QG. Based on the adjustment image group QG, the adjustment unit 115 adjusts, for example, an ink dispensing amount for each of the plurality of nozzles 39 constituting the print mechanism 15.

For example, the adjustment unit 115 determines the adjustment pattern image QT having a best image quality among the four adjustment pattern images QT included in the adjustment image group QG. Further, the adjustment unit 115 adjusts the ink dispensing amount based on the adjustment pattern image QT having the best image quality and the group identification information DPG1. For example, the adjustment unit 115 adjusts the print mechanism 15 so that the ink dispensing amount corresponding to the adjustment pattern image QT having the best image quality is dispensed from the nozzle 39.

When the image generation unit 114 generates the adjustment image group QG, the second acquisition unit 116 acquires the second measured temperature TR2 and the second measured humidity HR2 from the temperature and humidity sensor ST. For example, when the image generation unit 114 receives an operation of executing the scanning, the second acquisition unit 116 acquires the second measured temperature TR2 and the second measured humidity HR2.

The display control unit 117 decodes the code image QC generated by the image generation unit 114 and converts the code image QC into the group identification information DPG2.

The display control unit 117 may decode the code image QC generated by the image generation unit 114 and convert the code image QC into a third measured temperature TR3 and a third measured humidity HR3. The third measured temperature TR3 is the measured temperature TR indicated by the code CD corresponding to the code image QC. The third measured humidity HR3 is the measured humidity HR indicated by the code CD corresponding to the code image QC.

Further, when the group identification information DPG2 does not coincide with the group identification information DPG1, the display control unit 117 displays a first error message by the display mechanism 14. The display control unit 117 may display the first error message by the display mechanism 14 when at least one of the following conditions is satisfied, that is, a condition that the third measured temperature TR3 does not coincide with the first measured temperature TR1, and a condition that the third measured humidity HR3 does not coincide with the first measured humidity HR1.

The first error message includes, for example, a character image indicating that "The adjustment sheet read by the scanner is not a correct adjustment sheet. Please print the adjustment sheet again and execute the adjustment."

The display control unit 117 displays a second error message by the display mechanism 14 when at least one of the following conditions is satisfied, that is, a condition that a temperature difference ΔT between the first measured temperature TR1 and the second measured temperature TR2 is equal to or greater than a first threshold value SH1, and a condition that a humidity difference ΔH between the first measured humidity HR1 and the second measured humidity HR2 is equal to or greater than a second threshold value SH2. The first threshold value SH1 is, for example, 5° C. The second threshold value SH2 is, for example, 10%.

The second error message includes, for example, a character image indicating that "For the adjustment sheet read by the scanner, a long time has elapsed since the adjustment sheet was printed. Please print the adjustment sheet again and execute the adjustment."

The first measured temperature TR1 is the measured temperature TR acquired by the first acquisition unit 111. The first measured humidity HR1 is the measured humidity HR acquired by the first acquisition unit 111. In other words, the first measured temperature TR1 is the measured temperature TR when the print control unit 113 prints the code CD by the print mechanism 15. The first measured humidity HR1 is the measured humidity HR when the print control unit 113 prints the code CD by the print mechanism 15.

The second measured temperature TR2 is the measured temperature TR acquired by the second acquisition unit 116. The second measured humidity HR2 is the measured humidity HR acquired by the second acquisition unit 116. In other words, the second measured temperature TR2 is the measured temperature TR when the image generation unit 114 generates the adjustment image group QG.

The second measured humidity HR2 is the measured humidity HR when the image generation unit 114 generates the adjustment image group QG.

Next, the configuration of the print mechanism 15 will be described with reference to FIG. 2. FIG. 2 is a perspective view showing an example of the configuration of the print mechanism 15.

Figure 2:
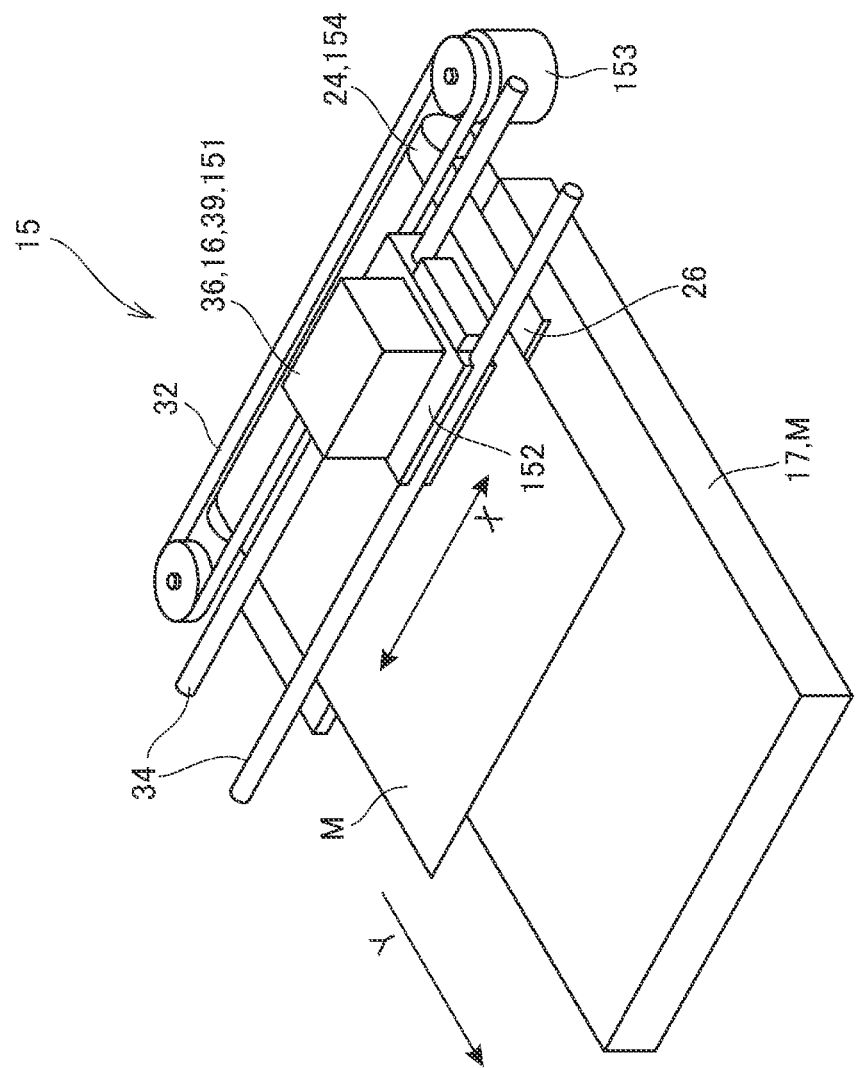
FIG. 2 is a perspective view showing an example of a configuration of a print mechanism.

As shown in FIG. 2, the print mechanism 15 includes the print medium accommodation unit 17, a paper feed roller 24, a platen 26, the carriage 152, the scanning motor 153, a pulling belt 32, and a guide rail 34. The paper feed roller 24 is driven by the conveyance motor 154. The pulling belt 32 is driven by the scanning motor 153. The guide rail 34 supports the carriage 152 so as to be movable in the main scanning direction X. The carriage 152 is supported by the guide rail 34 and is driven in the main scanning direction X via the pulling belt 32 by the scanning motor 153.

A head unit 36 is mounted on the carriage 152.

The head unit 36 includes the ink supply unit 16 and the print head 151.

The ink supply unit 16 is attachable to and detachable from the carriage 152. The ink supply unit 16 includes four ink tanks. The ink tanks contain inks of different colors. For example, inks of colors of cyan (C), magenta (M), yellow (Y), and black (K) are stored in different ink tanks. The ink stored in the ink supply unit 16 is supplied to the print head 151.

The print head 151 includes a common liquid chamber (not shown), a pressure generation chamber (not shown), a piezoelectric element (not shown), and the nozzles 39. The plurality of nozzles 39 are disposed along the sub-scanning direction Y on a surface of the print head 151 facing the platen 26.

The pressure generation chambers and the piezoelectric elements are disposed in one-to-one correspondence with the nozzles 39. A plurality of the pressure generation chambers and a plurality of the piezoelectric elements are disposed along the sub-scanning direction Y similarly to the nozzles 39. The ink supplied from the ink supply unit 16 passes through the common liquid chamber and the pressure generation chamber, and is dispensed from the nozzles 39 onto the print medium M.

The piezoelectric element is a piezoelectric actuator in a flexural vibration mode or a piezoelectric actuator in a longitudinal vibration mode. In a state in which the ink is supplied to the pressure generation chamber, the piezoelectric element vibrates a vibration plate forming a part of the pressure generation chamber to cause pressure fluctuation in the pressure generation chamber, and the print head 151 dispenses the ink from the nozzle 39 to the print medium M by using the pressure fluctuation.

The vibration plate forming a part of the pressure generation chamber is in contact with the piezoelectric element and vibrates with the vibration of the piezoelectric element. The vibration of the vibration plate is stopped when driving of the piezoelectric element is stopped. When the driving of the piezoelectric element is stopped, the vibration of the vibration plate does not stop immediately, and residual vibration occurs in the vibration plate. Therefore, the piezoelectric element vibrates in accordance with the residual vibration of the vibration plate, and a signal caused by the residual vibration is output from the piezoelectric element. The signal caused by the residual vibration indicates a back electromotive voltage. A residual vibration detection circuit (not shown) provided in the print head 151 detects the signal caused by the residual vibration.

The control unit 11 detects, for each of the piezoelectric elements provided in the print head 151, the state of a signal corresponding to the residual vibration output from the piezoelectric element via the residual vibration detection circuit.

Frequency characteristics of a signal waveform corresponding to the residual vibration output from the piezoelectric element vary depending on an ink state inside the print head 151. The ink state includes a normal state, a state in which air bubbles are mixed, a state in which the viscosity of the ink is increased, and a state in which paper powder is in close contact. Therefore, the control unit 11 can identify the ink state inside the print head 151 by analyzing the frequency characteristics of the signal waveform output from the piezoelectric element.

Further, the control unit 11 detects a position of the nozzle 39 in which the ink dispensing failure occurs among the plurality of nozzles 39 based on the state of the signal corresponding to the residual vibration output from the piezoelectric element.

The print medium M is wound around the paper feed roller 24 from the print medium accommodation unit 17, and is conveyed in the sub-scanning direction Y along a surface of the platen 26. The carriage 152 is pulled by the pulling belt 32 driven by the scanning motor 153 and moves in the main scanning direction X along the guide rail 34. Further, the print head 151 mounted on the carriage 152 also moves in the main scanning direction X.

The main scanning direction X is perpendicular to the sub-scanning direction Y.

With this configuration, the print mechanism 15 alternately repeats a liquid dispensing operation in which the print head 151 dispenses the ink from the nozzles 39 while moving in the main scanning direction X, and a conveyance operation in which the print medium M is conveyed in the sub-scanning direction Y. As a result, the print mechanism 15 prints images such as characters and figures on the print medium M. That is, the print mechanism 15 alternately repeats a movement of the print head 151 in the main scanning direction X (main scanning) and a movement of the print medium M in the sub-scanning direction Y (sub-scanning). By these operations, the print mechanism 15 arranges rows of dots arranged along the main scanning direction X in the sub-scanning direction Y (sub-scanning direction), and prints the images such as characters and figures on the print medium M.

Next, the first table TB1 will be described with reference to FIG. 3. FIG. 3 is a table showing an example of the first table TB1. The first table TB1 is a table in which the temperature T and the humidity H are associated with the group identification information DPG.

Figure 3:
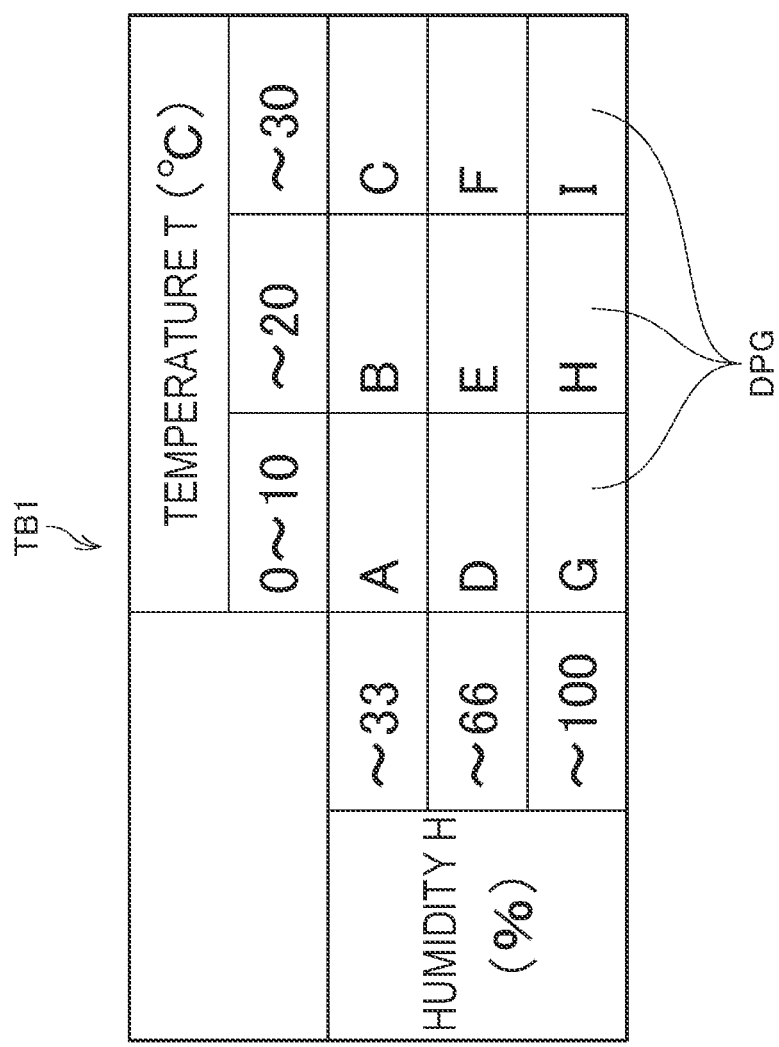
FIG. 3 is a table showing an example of a first table.

As shown in FIG. 3, the temperature T is divided into three ranges of, for example, "equal to or higher than 0° C. and lower than 10° C.", "equal to or higher than 10° C. and lower than 20° C.", and "equal to or higher than 20° C. and equal to or lower than 30° C.". The humidity H indicates a relative humidity, and is divided into three ranges of, for example, "equal to or higher than 0% and lower than 33%", "equal to or higher than 33% and lower than 66%", and "equal to or higher than 66% and equal to or lower than 100%". The group identification information DPG is represented by alphabets from "A" to "I", for example.

In the embodiment, a case where the temperature T is divided into three ranges and the humidity H is divided into three ranges will be described, whereas the present disclosure is not limited thereto. The temperature T may be divided into, for example, four ranges, and the humidity H may be divided into, for example, four ranges. As the number of divisions increases, the data generation unit 112 can appropriately select the group identification information DPG. As the number of divisions decreases, a capacity of the pattern storage unit 118 can be reduced, and a processing amount of the data generation unit 112 can be reduced.

In the embodiment, a case where the group identification information DPG is represented by alphabets will be described, whereas the present disclosure is not limited thereto. The group identification information DPG may be information for identifying each of the adjustment pattern groups PG. The group identification information DPG may be represented by, for example, a number.

The first measured temperature TR1 corresponds to an example of the temperature T. The first measured humidity HR1 corresponds to an example of the humidity H.

For example, when the first measured temperature TR1 is equal to or higher than 0° C. and lower than 10° C. and the first measured humidity HR1 is equal to or higher than 0% and lower than 33%, the data generation unit 112 selects "A" as the group identification information DPG.

For example, when the first measured temperature TR1 is equal to or higher than 10° C. and lower than 20° C. and the first measured humidity HR1 is equal to or higher than 33% and lower than 66%, the data generation unit 112 selects "E" as the group identification information DPG.

For example, when the first measured temperature TR1 is equal to or higher than 20° C. and lower than 30° C. and the first measured humidity HR1 is equal to or higher than 66% and equal to or lower than 100%, the data generation unit 112 selects "I" as the group identification information DPG.

Next, the second table TB2 will be described with reference to FIG. 4. FIG. 4 is a table showing an example of the second table TB2. The second table TB2 is a table in which the group identification information DPG and the adjustment pattern PT are associated with each other.

As shown in FIG. 4, in the second table TB2, four pattern numbers PN are stored in association with one piece of group identification information DPG. The four pattern numbers PN includes a first pattern number PN1 to a fourth pattern number PN4.

The pattern number PN indicates which one of the first adjustment pattern PT1 to the eighth adjustment pattern PT8 the adjustment pattern PT is. For example, the pattern number PN of the first adjustment pattern PT1 is "1". For example, the pattern number PN of the eighth adjustment pattern PT8 is "8". In other words, the pattern number PN of a K-th adjustment pattern PTK is "K". The integer K is any integer of 1 to 8.

For example, when the group identification information DPG is "A", the first pattern number PN1 is "1", the second pattern number PN2 is "3", the third pattern number PN3 is "4", and the fourth pattern number PN4 is "5". Therefore, the data generation unit 112 generates the print data DP including the first adjustment pattern PT1, the third adjustment pattern PT3, the fourth adjustment pattern PT4, and the fifth adjustment pattern PT5 as the adjustment pattern group PG. In other words, the adjustment pattern group PG whose group identification information DPG is "A" includes the first adjustment pattern PT1, the third adjustment pattern PT3, the fourth adjustment pattern PT4, and the fifth adjustment pattern PT5.

For example, when the group identification information DPG is "E", the first pattern number PN1 is "2", the second pattern number PN2 is "4", the third pattern number PN3 is "5", and the fourth pattern number PN4 is "7". Therefore, the data generation unit 112 generates the print data DP including the second adjustment pattern PT2, the fourth adjustment pattern PT4, the fifth adjustment pattern PT5, and the seventh adjustment pattern PT7 as the adjustment pattern group PG. In other words, the adjustment pattern group PG whose group identification information DPG is "E" includes the second adjustment pattern PT2, the fourth adjustment pattern PT4, the fifth adjustment pattern PT5, and the seventh adjustment pattern PT7.

Next, a case where the code CD is not printed on the adjustment sheet SA will be described with reference to FIGS. 5 to 7. First, the adjustment sheet SA and the adjustment pattern group PG will be described with reference to FIGS. 5 and 6. FIG. 5 is a diagram showing an example of the adjustment sheet SA and the adjustment pattern group PG.

Figure 5:
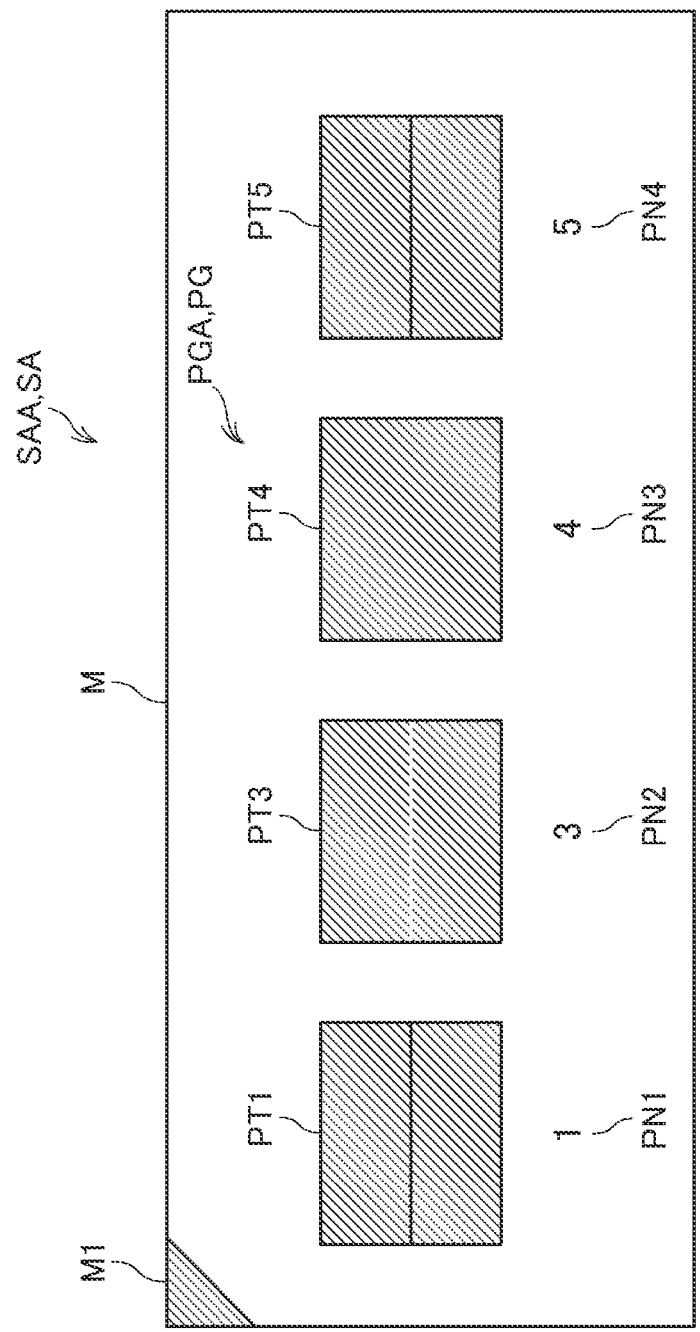
FIG. 5 is a diagram showing an example of an adjustment sheet and an adjustment pattern group.

In FIG. 5, a case where the adjustment sheet SA is an adjustment sheet SAA and the adjustment pattern group PG is an adjustment pattern group PGA will be described. The adjustment sheet SAA is the adjustment sheet SA which is the print medium M on which the adjustment pattern group PGA is printed. The adjustment pattern group PGA indicates the adjustment pattern group PG whose group identification information DPG is "A".

The adjustment pattern group PGA includes the first adjustment pattern PT1, the third adjustment pattern PT3, the fourth adjustment pattern PT4, and the fifth adjustment pattern PT5. The first adjustment pattern PT1, the third adjustment pattern PT3, the fourth adjustment pattern PT4, and the fifth adjustment pattern PT5 are arranged in order from left to right.

In FIG. 5, for convenience, the first pattern number PN1 to the fourth pattern number PN4 are described in association with the first adjustment pattern PT1, the third adjustment pattern PT3, the fourth adjustment pattern PT4, and the fifth adjustment pattern PT5, respectively. The print control unit 113 may not print the first pattern number PN1 to the fourth pattern number PN4 on the adjustment sheet SA.

A first mark M1 is printed at an upper left corner of the adjustment sheet SAA.

The first mark M1 is a mark for alignment when the user reads the adjustment sheet SAA by the scanner mechanism 12. For example, the user arranges the adjustment sheet SAA on the scanner mechanism 12 such that the first mark M1 is located at a corner of a reading region of a document table.

Figure 6:
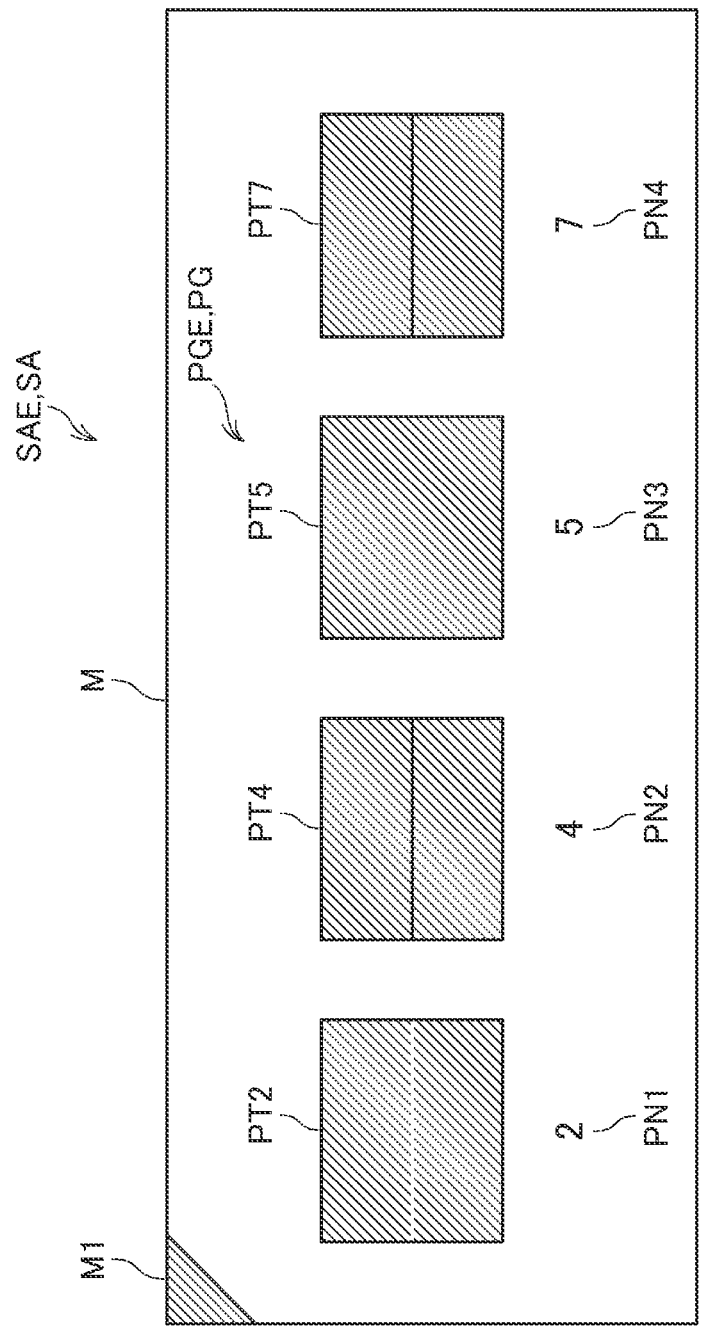
FIG. 6 is a diagram showing another example of the adjustment sheet and the adjustment pattern group.

FIG. 6 is a diagram showing another example of the adjustment sheet SA and the adjustment pattern group PG. In FIG. 6, a case where the adjustment sheet SA is an adjustment sheet SAE and the adjustment pattern group PG is an adjustment pattern group PGE will be described. The adjustment sheet SAE is the adjustment sheet SA which is the print medium M on which the adjustment pattern group PGE is printed. The adjustment pattern group PGE indicates the adjustment pattern group PG whose group identification information DPG is "E".

The adjustment pattern group PGE includes the second adjustment pattern PT2, the fourth adjustment pattern PT4, the fifth adjustment pattern PT5, and the seventh adjustment pattern PT7. The second adjustment pattern PT2, the fourth adjustment pattern PT4, the fifth adjustment pattern PT5, and the seventh adjustment pattern PT7 are arranged in order from left to right.

In FIG. 6, for convenience, the first pattern number PN1 to the fourth pattern number PN4 are described in association with the second adjustment pattern PT2, the fourth adjustment pattern PT4, the fifth adjustment pattern PT5, and the seventh adjustment pattern PT7, respectively. The print control unit 113 may not print the first pattern number PN1 to the fourth pattern number PN4 on the adjustment sheet SA.

The first mark M1 is printed at an upper left corner of the adjustment sheet SAE.

The first mark M1 is a mark for alignment when the user reads the adjustment sheet SAE by the scanner mechanism 12. For example, the user arranges the adjustment sheet SAE on the scanner mechanism 12 such that the first mark M1 is located at a corner of a reading region of a document table.

Next, processing of the control unit 11 will be described with reference to FIG. 7. FIG. 7 is a flowchart showing an example of the processing of the control unit 11.

Figure 7:
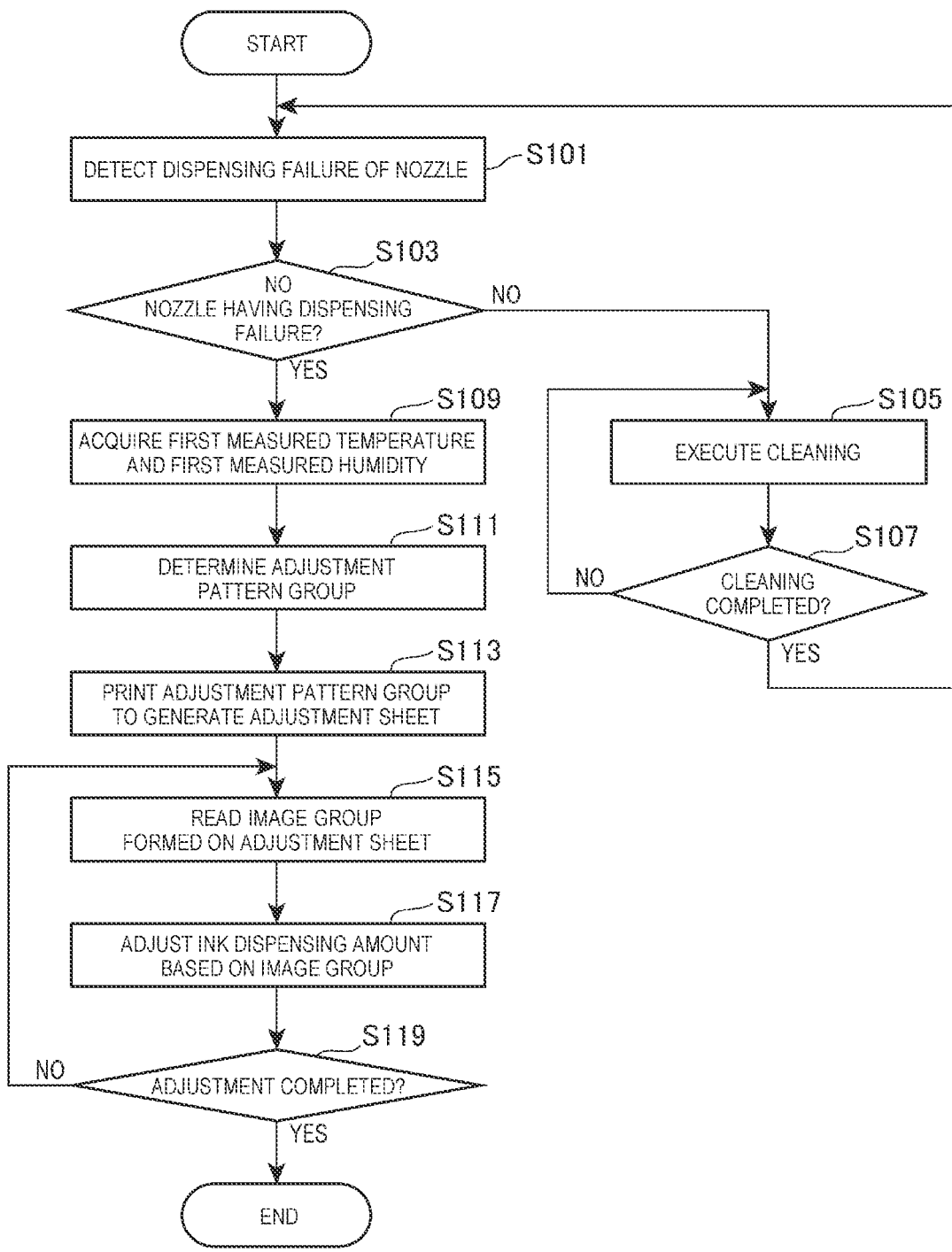
FIG. 7 is a flowchart showing an example of processing of a control unit.

As shown in FIG. 7, first, in step S101, the control unit 11 detects a dispensing failure of the nozzle 39 disposed in the print head 151 of the print mechanism 15.

Next, in step S103, the control unit 11 determines whether there is the nozzle 39 having a dispensing failure.

When the control unit 11 determines that there is no nozzle 39 having the dispensing failure (step S103; YES), the processing proceeds to step S109. When the control unit 11 determines that there is the nozzle 39 having the dispensing failure (step S103; NO), the processing proceeds to step S105.

Then, in step S105, the control unit 11 executes cleaning of the print head 151.

Next, in step S107, the control unit 11 determines whether the cleaning of the print head 151 is completed.

When the control unit 11 determines that the cleaning of the print head 151 is not completed (step S107; NO), the processing returns to step S105. When the control unit 11 determines that the cleaning of the print head 151 is completed (step S107; YES), the processing returns to step S101.

In the case of YES in step S103, in step S109, the first acquisition unit 111 acquires the first measured temperature TR1 and the first measured humidity HR1 from the temperature and humidity sensor ST.

Next, in step S111, the data generation unit 112 determines the adjustment pattern group PG corresponding to the first measured temperature TR1 and the first measured humidity HR1. The data generation unit 112 reads the determined adjustment pattern group PG from the pattern storage unit 118.

Next, in step S113, the print control unit 113 prints, by the print mechanism 15, the adjustment pattern group PG to generate the adjustment sheet SA.

Next, in step S115, the image generation unit 114 reads, by the scanner mechanism 12, the adjustment pattern group PG formed on the adjustment sheet SA to generate the adjustment image group QG.

Next, in step S117, the adjustment unit 115 adjusts, based on the adjustment image group QG generated in step S115, an ink dispensing amount for each of the plurality of nozzles 39 constituting the print mechanism 15.

Next, in step S119, the adjustment unit 115 determines whether the adjustment of the ink dispensing amount is completed.

When the adjustment unit 115 determines that the adjustment of the ink dispensing amount is not completed (step S119; NO), the processing returns to step S115. When the adjustment unit 115 determines that the adjustment of the ink dispensing amount is completed (step S119; YES), the processing ends thereafter.

Step S109 corresponds to an example of an "acquisition step". Step S111 corresponds to an example of a "data generation step".

Figure 8:
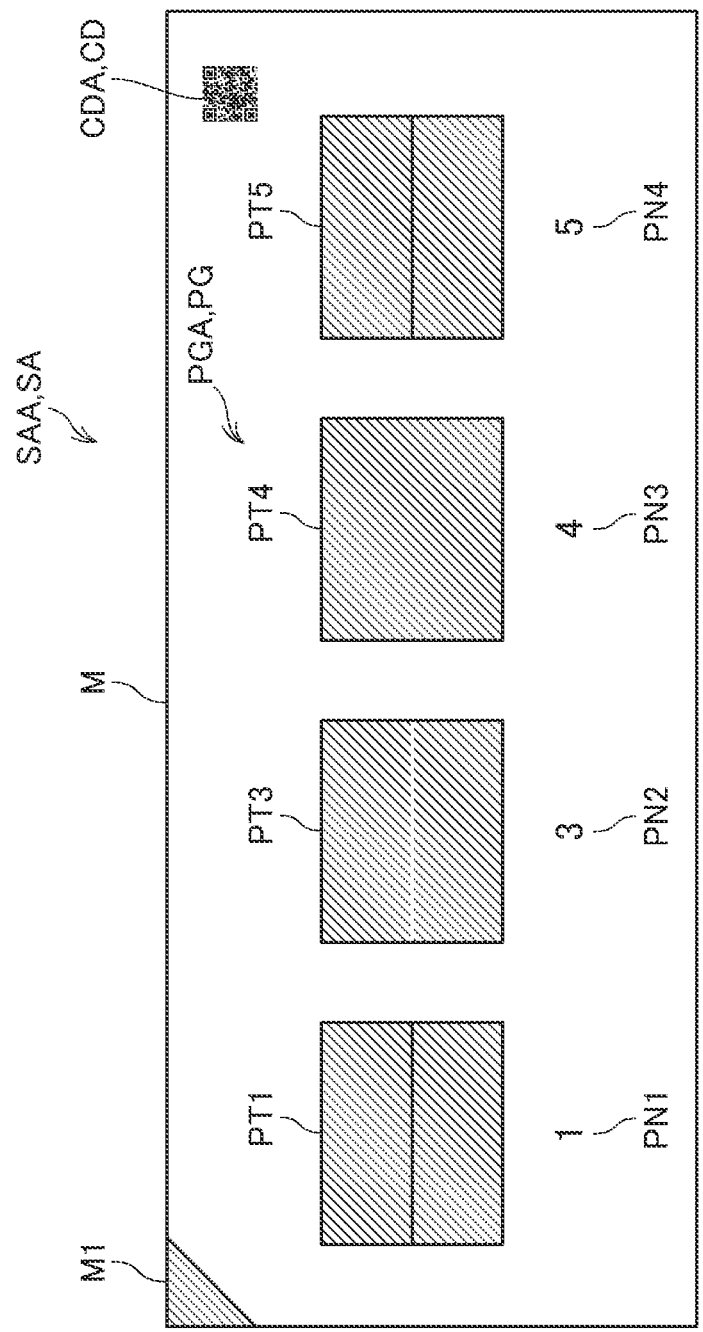
FIG. 8 is a diagram showing an example of an adjustment sheet and an adjustment pattern group.

Next, a case where the code CD is printed on the adjustment sheet SA will be described with reference to FIGS. 8 to 11. First, the adjustment sheet SA and the adjustment pattern group PG will be described with reference to FIGS. 8 and 9. FIG. 8 is a diagram showing an example of the adjustment sheet SA and the adjustment pattern group PG.

In FIG. 8, a case where the adjustment sheet SA is the adjustment sheet SAA and the adjustment pattern group PG is the adjustment pattern group PGA will be described. The adjustment sheet SAA is the adjustment sheet SA which is the print medium M on which the adjustment pattern group PGA is printed. The adjustment pattern group PGA indicates the adjustment pattern group PG whose group identification information DPG is "A".

The adjustment sheet SAA shown in FIG. 8 is different from the adjustment sheet SAA shown in FIG. 5 in that a code CDA is printed at an upper right corner of the adjustment sheet SAA. The code CDA corresponds to an example of the code CD. Hereinafter, differences from the adjustment sheet SAA shown in FIG. 5 will be described. Description of configurations similar to those of the adjustment sheet SAA shown in FIG. 5 will be omitted.

The code CDA indicates the group identification information DPG1, the first measured temperature TR1, and the first measured humidity HR1. The group identification information DPG1 is "A". The first measured temperature TR1 is, for example, 5° C. The first measured humidity HR1 is, for example, 20%.

Figure 9:
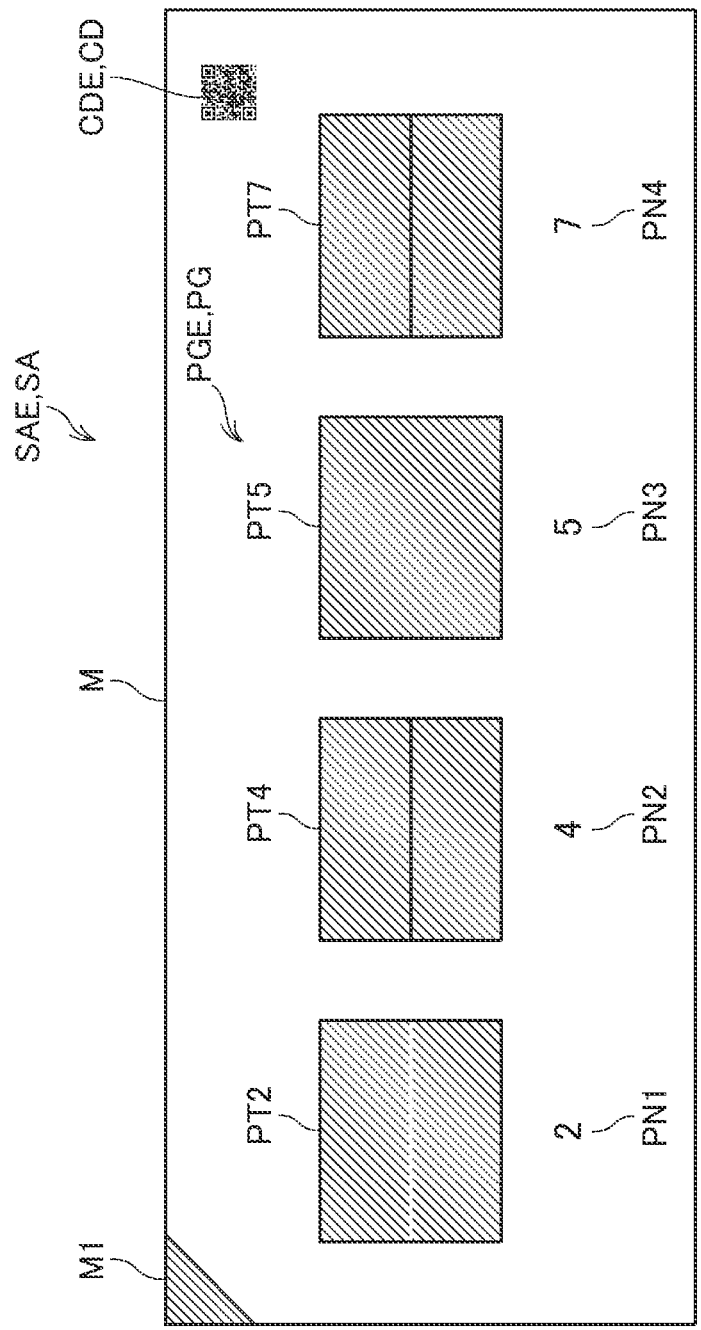
FIG. 9 is a diagram showing another example of the adjustment sheet and the adjustment pattern group.

FIG. 9 is a diagram showing another example of the adjustment sheet SA and the adjustment pattern group PG. In FIG. 9, a case where the adjustment sheet SA is the adjustment sheet SAE and the adjustment pattern group PG is the adjustment pattern group PGE will be described. The adjustment sheet SAE is the adjustment sheet SA which is the print medium M on which the adjustment pattern group PGE is printed. The adjustment pattern group PGE indicates the adjustment pattern group PG whose group identification information DPG is "E".

The adjustment sheet SAE shown in FIG. 9 is different from the adjustment sheet SAE shown in FIG. 6 in that a code CDE is printed at the upper right corner of the adjustment sheet SAE. The code CDE corresponds to an example of the code CD. Hereinafter, differences from the adjustment sheet SAA shown in FIG. 6 will be described. Description of configurations similar to those of the adjustment sheet SAA shown in FIG. 6 will be omitted.

The code CDE indicates the group identification information DPG1, the first measured temperature TR1, and the first measured humidity HR1. The group identification information DPG1 is "E". The first measured temperature TR1 is, for example, 15° C. The first measured humidity HR1 is, for example, 55%.

Next, processing of the control unit 11 will be described with reference to FIGS. 10 and 11. Each of FIGS. 10 and 11 is a flowchart showing an example of the processing of the control unit 11.

Figure 10:
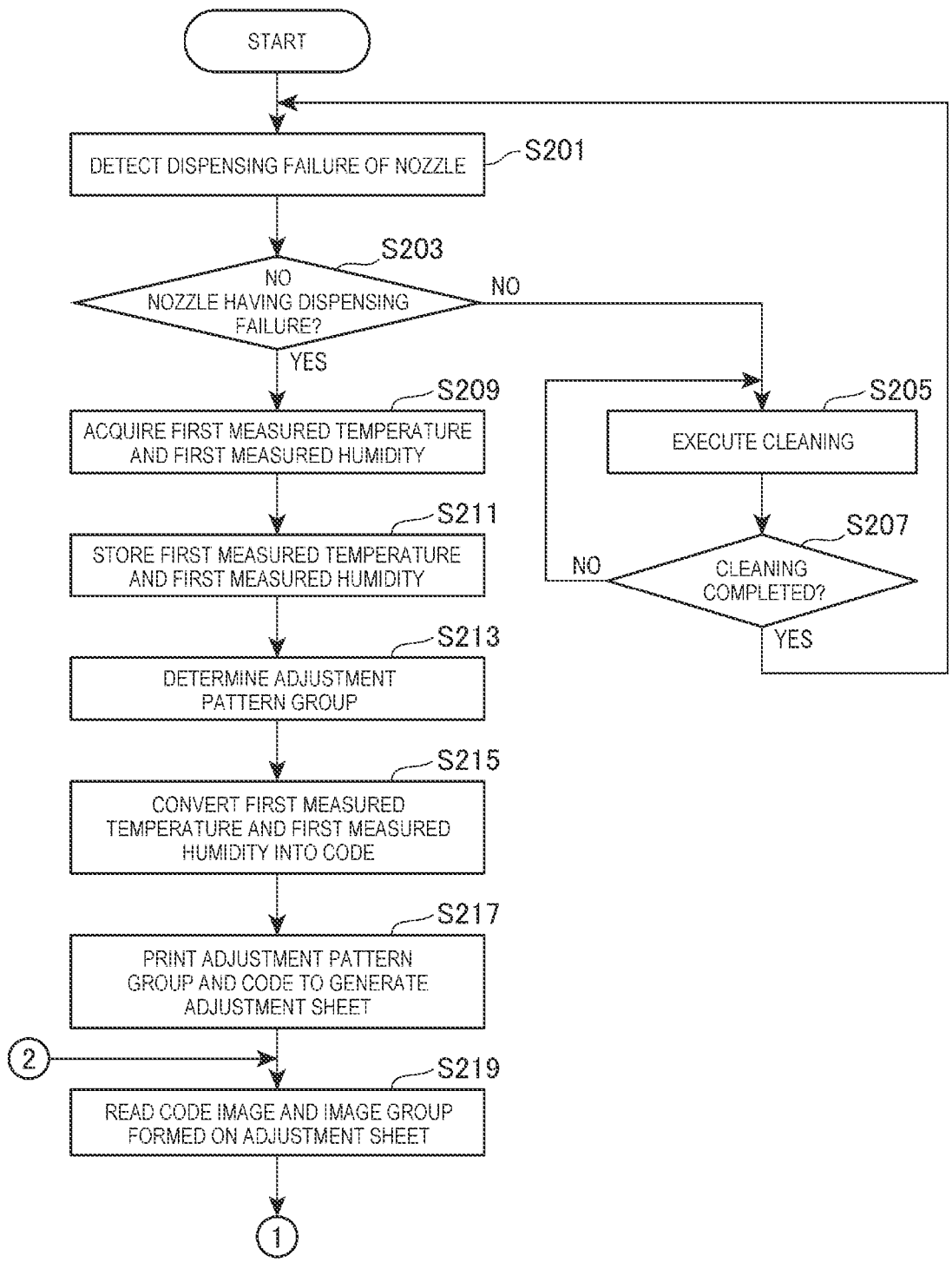
FIG. 10 is a flowchart showing an example of the processing of the control unit.
Figure 11:
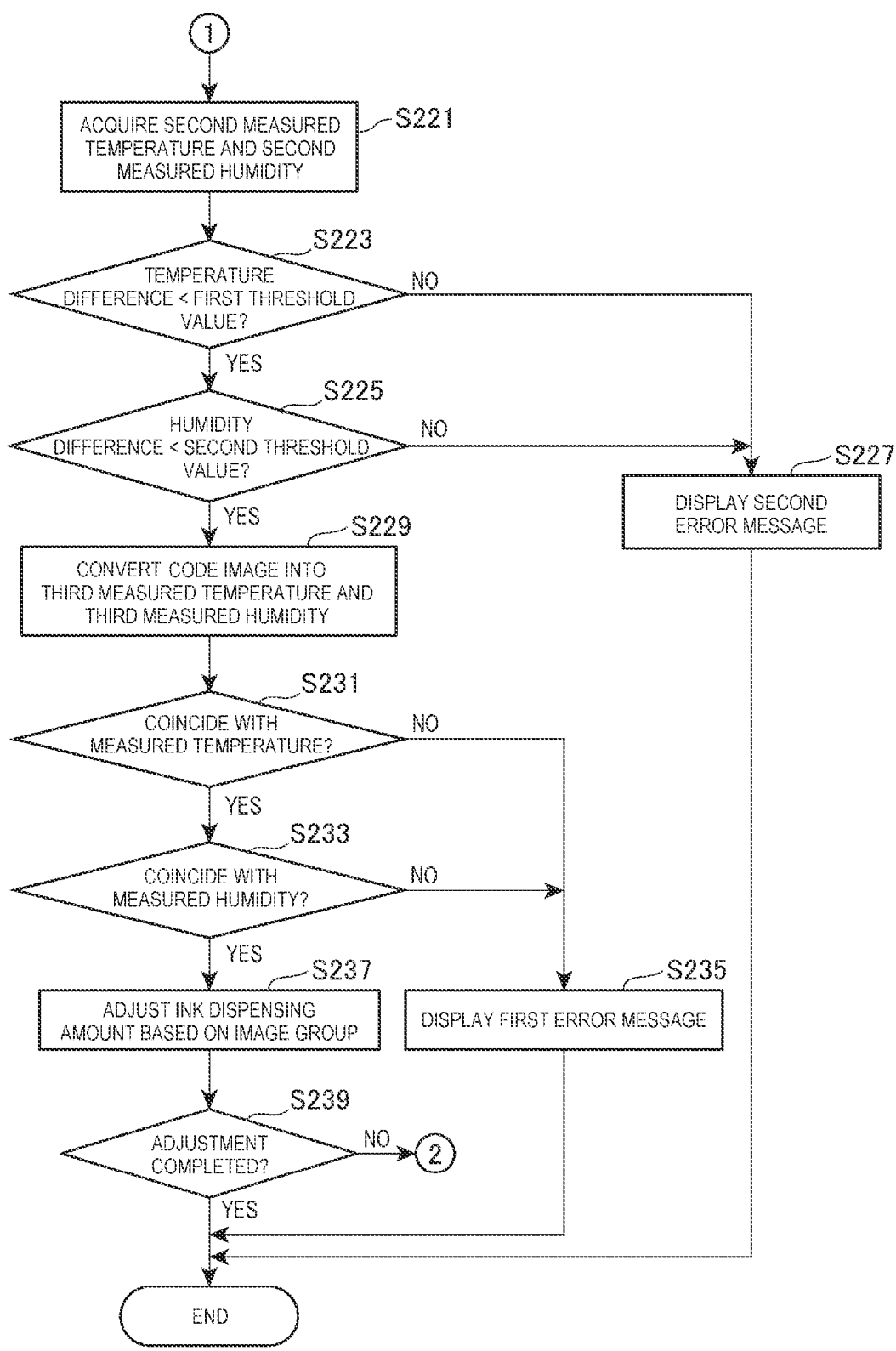
FIG. 11 is a flowchart showing the example of the processing of the control unit.

As shown in FIG. 10, first, in step S201, the control unit 11 detects a dispensing failure of the nozzle 39 disposed in the print head 151 of the print mechanism 15.

Next, in step S203, the control unit 11 determines whether there is the nozzle 39 having a dispensing failure.

When the control unit 11 determines that there is no nozzle 39 having the dispensing failure (step S203; YES), the processing proceeds to step S209. When the control unit 11 determines that there is the nozzle 39 having the dispensing failure (step S203; NO), the processing proceeds to step S205.

Then, in step S205, the control unit 11 executes cleaning of the print head 151.

Next, in step S207, the control unit 11 determines whether the cleaning of the print head 151 is completed.

When the control unit 11 determines that the cleaning of the print head 151 is not completed (step S207; NO), the processing returns to step S205. When the control unit 11 determines that the cleaning of the print head 151 is completed (step S207; YES), the processing returns to step S201.

In the case of YES in step S203, in step S209, the first acquisition unit 111 acquires the first measured temperature TR1 and the first measured humidity HR1 from the temperature and humidity sensor ST.

Next, in step S211, the first acquisition unit 111 stores the first measured temperature TR1 and the first measured humidity HR1 in the measured value storage unit 119.

Next, in step S213, the data generation unit 112 determines the adjustment pattern group PG corresponding to the first measured temperature TR1 and the first measured humidity HR1. The data generation unit 112 reads the determined adjustment pattern group PG from the pattern storage unit 118. The data generation unit 112 stores the group identification information DPG1 corresponding to the determined adjustment pattern group PG in the measured value storage unit 119.

Next, in step S215, the data generation unit 112 encodes the group identification information DPG1, the first measured temperature TR1, and the first measured humidity HR1, and converts the group identification information DPG1, the first measured temperature TR1, and the first measured humidity HR1 into the code CD. The data generation unit 112 generates the print data DP including the adjustment pattern group PG and the code CD.

Next, in step S217, the print control unit 113 prints, by the print mechanism 15, the adjustment pattern group PG and the code CD to generate the adjustment sheet SA.

Next, in step S219, the image generation unit 114 reads, by the scanner mechanism 12, the adjustment pattern group PG and the code CD formed on the adjustment sheet SA to generate the adjustment image group QG and the code image QC.

Next, as shown in FIG. 11, in step S221, the second acquisition unit 116 acquires the second measured temperature TR2 and the second measured humidity HR2 from the temperature and humidity sensor ST.

Next, in step S223, the display control unit 117 determines whether a temperature difference ΔT between the first measured temperature TR1 and the second measured temperature TR2 is less than the first threshold value SH1.

When the display control unit 117 determines that the temperature difference ΔT is equal to or greater than the first threshold value SH1 (step S223; NO), the processing proceeds to step S227. When the display control unit 117 determines that the temperature difference ΔT is less than the first threshold value SH1 (step S223; YES), the processing proceeds to step S225.

Then, in step S225, the display control unit 117 determines whether a humidity difference ΔH between the first measured humidity HR1 and the second measured humidity HR2 is less than the second threshold value SH2.

When the display control unit 117 determines that the humidity difference ΔH is equal to or greater than the second threshold value SH2 (step S225; NO), the processing proceeds to step S227.

Then, in step S227, the display control unit 117 displays a second error message by the display mechanism 14. Thereafter, the processing ends.

When the display control unit 117 determines that the humidity difference ΔH is less than the second threshold value SH2 (step S225; YES), the processing proceeds to step S229.

Then, in step S229, the code image QC is decoded and converted into the third measured temperature TR3 and the third measured humidity HR3.

Next, in step S231, the display control unit 117 determines whether the third measured temperature TR3 coincides with the first measured temperature TR1.

When the display control unit 117 determines that the third measured temperature TR3 does not coincide with the first measured temperature TR1 (step S231; NO), the processing proceeds to step S235. When the display control unit 117 determines that the third measured temperature TR3 coincides with the first measured temperature TR1 (step S231; YES), the processing proceeds to step S233.

Then, in step S233, the display control unit 117 determines whether the third measured humidity HR3 coincides with the first measured humidity HR1.

When the display control unit 117 determines that the third measured humidity HR3 does not coincide with the first measured humidity HR1 (step S233; NO), the processing proceeds to step S235.

Then, in step S235, the display control unit 117 displays a first error message by the display mechanism 14. Thereafter, the processing ends.

When the display control unit 117 determines that the third measured humidity HR3 coincides with the first measured humidity HR1 (step S233; YES), the processing proceeds to step S237.

Then, in step S237, the adjustment unit 115 adjusts, based on the adjustment image group QG generated in step S219, an ink dispensing amount for each of the plurality of nozzles 39 constituting the print mechanism 15.

Next, in step S239, the adjustment unit 115 determines whether the adjustment of the ink dispensing amount is completed.

When the adjustment unit 115 determines that the adjustment of the ink dispensing amount is not completed (step S239; NO), the processing returns to step S219 shown in FIG. 10. When the adjustment unit 115 determines that the adjustment of the ink dispensing amount is completed (step S239; YES), the processing ends thereafter.

Step S209 corresponds to an example of the "acquisition step". Steps S213 and S215 correspond to an example of the "data generation step".

As described above with reference to FIGS. 1 to 11, the multifunction peripheral 1 according to the embodiment includes the scanner mechanism 12, the inkjet-type print mechanism 15, the display mechanism 14, and the control unit 11 that controls the scanner mechanism 12, the print mechanism 15, and the display mechanism 14. The control unit 11 includes the pattern storage unit 118 that stores the temperature T, the humidity H, and the adjustment pattern group PG including a plurality of adjustment patterns, in association with each other, the first acquisition unit 111 that acquires the first measured temperature TR1 and the first measured humidity HR1 from the temperature and humidity sensor ST, and the data generation unit 112 that reads the adjustment pattern group PG corresponding to the first measured temperature TR1 and the first measured humidity HR1 acquired by the first acquisition unit 111 from the pattern storage unit 118 and generates the print data DP including the read adjustment pattern group PG.

According to this configuration, the adjustment pattern group PG corresponding to the first measured temperature TR1 and the first measured humidity HR1 acquired from the temperature and humidity sensor ST is read from the pattern storage unit 118, and the print data DP including the read adjustment pattern group PG is generated.

Therefore, it is possible to print the appropriate adjustment pattern group PG according to the use environment (temperature and humidity). Therefore, the print mechanism 15 can be appropriately adjusted according to the use environment.

The multifunction peripheral 1 according to the embodiment includes the print control unit 113 that prints, by the print mechanism 15, the print data DP and generates the adjustment sheet SA on which an image corresponding to the print data DP is printed on the print medium M, the image generation unit 114 that reads, by the scanner mechanism 12, the adjustment pattern group PG formed on the adjustment sheet SA and generates the adjustment image group QG corresponding to the adjustment pattern group PG, and the adjustment unit 115 that adjusts the ink dispensing amount for each of the plurality of nozzles 39 constituting the print mechanism 15 based on the adjustment image group QG.

According to this configuration, the scanner mechanism 12 reads the adjustment pattern group PG formed on the adjustment sheet SA to generate the adjustment image group QG corresponding to the adjustment pattern group PG, and the ink dispensing amount is adjusted for each of the plurality of nozzles 39 constituting the print mechanism 15 based on the adjustment image group QG.

Therefore, the ink dispensing amount can be adjusted for each of the plurality of nozzles 39 based on the adjustment image group QG. Therefore, it is possible to appropriately adjust the ink dispensing amount according to the use environment (temperature and humidity).

The multifunction peripheral 1 according to the embodiment includes the measured value storage unit 119 that stores the group identification information DPG1 of the adjustment pattern group PG corresponding to the first measured temperature TR1 and the first measured humidity HR1 acquired by the first acquisition unit 111. The adjustment unit 115 determines the adjustment pattern PT having the best image quality among the plurality of adjustment patterns PT included in the adjustment image group QG, and adjusts the ink dispensing amount based on the adjustment pattern PT having the best image quality and the group identification information DPG1.

According to this configuration, the adjustment unit 115 determines the adjustment pattern PT having the best image quality among the plurality of adjustment patterns PT included in the adjustment image group QG, and adjusts the ink dispensing amount based on the adjustment pattern PT having the best image quality and the group identification information DPG1.

Therefore, it is possible to adjust the print mechanism 15 so that the ink dispensing amount corresponding to the adjustment pattern PT having the best image quality among the plurality of adjustment patterns PT included in the adjustment image group QG is dispensed from the nozzle 39. Therefore, it is possible to appropriately adjust the ink dispensing amount according to the use environment (temperature and humidity).

In the multifunction peripheral 1 according to the embodiment, the print data DP includes the code CD indicating the measured temperature TR and the measured humidity HR acquired by the first acquisition unit 111. The print control unit 113 prints the code CD by the print mechanism 15. The image generation unit 114 reads, by the scanner mechanism 12, the code CD to acquire the third measured temperature TR3 and the third measured humidity HR3 corresponding to the code CD. The control unit 11 includes the measured value storage unit 119 and the display control unit 117. The measured value storage unit 119 stores the first measured temperature TR1 and the first measured humidity HR1 acquired by the first acquisition unit 111. The display control unit 117 displays, by the display mechanism 14, the first error message when at least one of the following conditions is satisfied, that is, the condition that the third measured temperature TR3 corresponding to the code CD does not coincide with the first measured temperature TR1 stored in the measured value storage unit 119, and the condition that the third measured humidity HR3 corresponding to the code CD does not coincide with the first measured humidity HR1 stored in the measured value storage unit 119.

According to this configuration, when at least one of the following conditions is satisfied, that is, the condition that the third measured temperature TR3 corresponding to the code CD does not coincide with the first measured temperature TR1 stored in the measured value storage unit 119, and the condition that the third measured humidity HR3 corresponding to the code CD does not coincide with the first measured humidity HR1 stored in the measured value storage unit 119, the first error message is displayed by the display mechanism 14.

Therefore, for example, when the user reads, by the scanner mechanism 12, the adjustment sheet SA printed by another multifunction peripheral 1, the user can be notified that the read adjustment sheet SA is not the correct adjustment sheet SA. Therefore, the convenience of the user can be improved. It is possible to prevent an inappropriate adjustment from being executed on the print mechanism 15.

In the multifunction peripheral 1 according to the embodiment, the control unit 11 includes the second acquisition unit 116 that acquires the second measured temperature TR2 and the second measured humidity HR2 from the temperature and humidity sensor ST when the image generation unit 114 generates the adjusted image group QG. The display control unit 117 displays, by the display mechanism 14, the second error message when at least one of the following conditions is satisfied, that is, the condition that the temperature difference $\Delta T$ between the second measured temperature TR2 acquired by the second acquisition unit 116 and the first measured temperature TR1 stored in the measured value storage unit 119 is equal to or greater than the first threshold value SH1, and the condition that the humidity difference $\Delta H$ between the second measured humidity HR2 acquired by the second acquisition unit 116 and the first measured humidity HR1 stored in the measured value storage unit 119 is equal to or greater than the second threshold value SH2.

According to this configuration, when at least one of the following conditions is satisfied, that is, the condition that the temperature difference $\Delta T$ between the second measured temperature TR2 and the first measured temperature TR1 is equal to or greater than the first threshold value SH1, and the condition that the humidity difference $\Delta H$ between the second measured humidity HR2 and the first measured humidity HR1 is equal to or greater than the second threshold value SH2, the display control unit 117 displays, by the display mechanism 14, the second error message. The first measured temperature TR1 and the first measured humidity HR1 are acquired from the temperature and humidity sensor ST when the print data DP including the adjustment pattern group PG is generated. The second measured temperature TR2 and the second measured humidity HR2 are acquired from the temperature and humidity sensor ST when the image generation unit 114 generates the adjustment image group QG.

For example, when a long period of time elapses from when the print data DP is generated to when the adjustment image group QG is generated, the use environment (temperature and humidity) may change. In such a case, at least one of the following conditions is satisfied, that is, the condition that the temperature difference $\Delta T$ between the second measured temperature TR2 and the first measured temperature TR1 is equal to or greater than the first threshold value SH1, and the condition that the humidity difference $\Delta H$ between the second measured humidity HR2 and the first measured humidity HR1 is equal to or greater than the second threshold value SH2. Therefore, it is possible to notify the user that the use environment is changed. Therefore, the convenience of the user can be improved. It is possible to prevent an inappropriate adjustment from being executed on the print mechanism 15.

In the control method of the multifunction peripheral 1 according to the embodiment, the multifunction peripheral 1 includes the scanner mechanism 12, the inkjet-type print mechanism 15, the display mechanism 14, and the control unit 11 that controls the scanner mechanism 12, the print mechanism 15, and the display mechanism 14. The control unit 11 includes the pattern storage unit 118 that stores the temperature T, the humidity H, and the adjustment pattern group PG including a plurality of adjustment patterns, in association with each other. The control unit executes an acquisition step of acquiring the first measured temperature TR1 and the first measured humidity HR1 from the temperature and humidity sensor ST, and a data generation step of reading the adjustment pattern group PG corresponding to the first measured temperature TR1 and the first measured humidity HR1 acquired in the acquisition step from the pattern storage unit 118 and generating the print data DP including the read adjustment pattern group PG.

According to this configuration, the same effects as those of the multifunction peripheral 1 according to the embodiment can be obtained.

The embodiment shows an aspect, and any modifications and applications can be made without departing from the spirit of the embodiment.

In the embodiment, a case where the "image forming device" is the multifunction peripheral 1 is described, whereas the present disclosure is not limited thereto. The "image forming device" may include the print mechanism 15. For example, the "image forming device" may be a printer. In this case, the printer needs to be communicably connected to a scanner separate from the printer.

In the embodiment, a control method implemented by the processor 11A included in the multifunction peripheral 1 executing the control program PGM is described, whereas the control program PGM executed by the processor 11A in order to implement the control method may be implemented in the form of a recording medium in which the control program PGM is recorded in a computer-readable manner or a transmission medium that transmits the control program PGM.

As the recording medium, a magnetic or optical recording medium or a semiconductor memory device can be used. Examples of the recording medium include portable or fixed recording media such as a flexible disk, an HDD, a compact disk read only memory (CD-ROM), a digital versatile disk (DVD), a Blu-ray (registered trademark) disc, a magneto-optical disk, a flash memory, and a card-type recording medium.

The recording medium may be a non-volatile storage device such as a RAM, a ROM, or an HDD, which is an internal storage device included in the multifunction peripheral 1.

The function of the control unit 11 may be implemented by one or more processors or a semiconductor chip. The control unit 11 may further include a co-processor such as a system-on-a-chip (SoC), a micro control unit (MCU), or a field-programmable gate array (FPGA). The control unit 11 may cause both the CPU and the co-processor to cooperate with each other, or may perform various types of control by selectively using one of the CPU and the co-processor.

Processing units of the flowcharts of FIGS. 7, 10, and 11 are divided according to main processing contents in order to facilitate understanding of the processing of the control unit 11, and are not limited by the way of dividing the processing units and the names thereof. The processing unit of the flowchart may be divided into more processing units according to the processing content. One processing unit may be divided so as to include more processing. The order of the processing may be appropriately changed or may be omitted as long as there is no problem in the spirit. For example, when it is clear that there is no nozzle having a dispensing failure, steps S101 to S107 in FIG. 7 may be omitted, or steps S201 to S207 in FIG. 10 may be omitted. When the processing from the printing of the adjustment sheet to the reading of the image group of the adjustment sheet is performed in a short time, steps S221 to S227 in FIG. 11 may be omitted.

Each functional unit shown in FIG. 1 shows a functional configuration, and a specific implementation form is not particularly limited. It is not always necessary to implement hardware individually corresponding to each functional unit, and it is also possible to adopt a configuration in which the functions of a plurality of functional units are implemented by one processor executing a program. A part of the functions implemented by software in the above-described embodiment may be hardware, or a part of the functions implemented by hardware may be software. In addition, specific detailed configurations of other units of the multifunction peripheral 1 can be freely changed without departing from the spirit of the disclosure.

What is claimed is:

1. An image forming device comprising:
a scanner mechanism;
an inkjet-type print mechanism;
a display mechanism; and
a control unit configured to control the scanner mechanism, the print mechanism, and the display mechanism, wherein
the control unit includes
a pattern storage unit configured to store a temperature, a humidity, and an adjustment pattern group including a plurality of adjustment patterns, in association with each other,
a first acquisition unit configured to acquire a measured temperature and a measured humidity from a temperature and humidity sensor,
a data generation unit configured to read an adjustment pattern group corresponding to the measured temperature and the measured humidity acquired by the first acquisition unit from the pattern storage unit, and generate print data including the read adjustment pattern group;
a print control unit configured to print, by the print mechanism, the print data and generate an adjustment sheet on which an image corresponding to the print data is printed on a print medium;
an image generation unit configured to read, by the scanner mechanism, the adjustment pattern group formed on the adjustment sheet and generate an image group corresponding to the adjustment pattern group; and an adjustment unit configured to adjust, based on the image group, an ink dispensing amount for each of a plurality of nozzles constituting the print mechanism.

2. The image forming device according to claim 1, further comprising:
a measured value storage unit configured to store group identification information of the adjustment pattern group corresponding to the measured temperature and the measured humidity acquired by the first acquisition unit, wherein
the adjustment unit is configured to determine an adjustment pattern having a best image quality among a plurality of adjustment patterns included in the image group, and adjust the ink dispensing amount based on the adjustment pattern having the best image quality and the group identification information.

3. The image forming device according to claim 1, wherein
the print data includes a code indicating the measured temperature and the measured humidity acquired by the first acquisition unit,
the print control unit is configured to print the code by the print mechanism,
the image generation unit is configured to read, by the scanner mechanism, the code to acquire a measured temperature and a measured humidity corresponding to the code, and
the control unit includes
a measured value storage unit configured to store the measured temperature and the measured humidity acquired by the first acquisition unit, and
a display control unit configured to display, by the display mechanism, a first error message when at least one of following conditions is satisfied, that is, a condition that the measured temperature corresponding to the code does not coincide with the measured temperature stored in the measured value storage unit, and a condition that the measured humidity corresponding to the code does not coincide with the measured humidity stored in the measured value storage unit.

4. The image forming device according to claim 3, wherein
the control unit includes
a second acquisition unit configured to acquire a measured temperature and a measured humidity from the temperature and humidity sensor when the image generation unit generates the image group, and
the display control unit is configured to display, by the display mechanism, a second error message when at least one of following conditions is satisfied, that is, a condition that a difference between the measured temperature acquired by the second acquisition unit and the measured temperature stored in the measured value storage unit is equal to or greater than a first threshold value, and a condition that a difference between the measured humidity acquired by the second acquisition unit and the measured humidity stored in the measured value storage unit is equal to or greater than a second threshold value.

5. A control method of an image forming device, wherein the image forming device includes
a scanner mechanism,
an inkjet-type print mechanism,
a display mechanism, and
a control unit configured to control the scanner mechanism, the print mechanism, and the display mechanism, the control unit includes a pattern storage unit configured to store a temperature, a humidity, and an adjustment pattern group including a plurality of adjustment patterns, in association with each other, and the control unit executes an acquisition step of acquiring a measured temperature and a measured humidity from a temperature and humidity sensor; and a data generation step of reading an adjustment pattern group corresponding to the measured temperature and the measured humidity acquired in the acquisition step from the pattern storage unit, and generating print data including the read adjustment pattern group;

a print control step of printing, by the print mechanism, the print data and generating an adjustment sheet on which an image corresponding to the print data is printed on a print medium;

an image generation step of reading, by the scanner mechanism, the adjustment pattern group formed on the adjustment sheet and generating an image group corresponding to the adjustment pattern group; and an adjustment step of adjusting, based on the image group, an ink dispensing amount for each of a plurality of nozzles constituting the print mechanism.

* * * * *